US005483006A

United States Patent [19]
Ruepping

[11] Patent Number: 5,483,006
[45] Date of Patent: Jan. 9, 1996

[54] NITROSAMINE-FREE CURING OF CHLOROPRENE/SULFUR COPOLYMERS

[75] Inventor: Christian Ruepping, Petit-Lancy/GE, Switzerland

[73] Assignee: E. I. Du Pont de Nemours and Company, Wilmington, Del.

[21] Appl. No.: 284,657

[22] PCT Filed: Feb. 12, 1993

[86] PCT No.: PCT/US93/01275

§ 371 Date: Aug. 18, 1994

§ 102(e) Date: Aug. 18, 1994

[87] PCT Pub. No.: WO93/17073

PCT Pub. Date: Sep. 2, 1993

[30] Foreign Application Priority Data

Feb. 22, 1992 [DE] Germany ............................ 42 05 419.2

[51] Int. Cl.⁶ ...................................................... C08F 8/30
[52] U.S. Cl. ........................................ 525/331.1; 525/349
[58] Field of Search .................................. 525/331.1, 349

[56] References Cited

U.S. PATENT DOCUMENTS 4,695,609  9/1987  Stevenson et al. .................... 525/352
5,254,635  10/1993  Stevenson et al. .................. 525/332.7
5,326,828  7/1994  Rowland et al. ....................... 525/346

OTHER PUBLICATIONS

T. L. Jablonowski, "Tetrabenzylthiuram disulfide and N–cyclohexylbis–(2–benzothiazolesulfen)amide as Alternative Accelerators to Reduce the Generation of Hazardous Nitrosamines", Paper No. 41, Presented at ACS Rubber Div. Meeting, Oct. 8–11, 1991.

Primary Examiner—Edward Cain
Attorney, Agent, or Firm—Marilyn H. Bromels

[57] ABSTRACT

Chloroprene/sulfur copolymers peptized either by xanthogen sulfides alone or in combination with mercaptobenzothiazole in an alkaline dispersion are cured in the presence of N-cyclohexyl-2-benzothiazyl-sulfenamide or mercaptobenzothiazole disulfide as an accelerator and in the absence of nitrosamine forming additives. Metal oxides are the usual curing agents.

8 Claims, No Drawings

NITROSAMINE-FREE CURING OF CHLOROPRENE/SULFUR COPOLYMERS

BACKGROUND OF THE INVENTION

1. Field of Invention

This invention relates to processes for curing chloroprene/sulfur copolymers which do not form nitrosamines.

2. Background Art

Conventional chloroprene/sulfur-copolymers are in general made by radical induced emulsion polymerization of chloroprene (2-chloro-1,3-butadiene) in the presence of elementary-sulfur and, if required for certain applications, of a copolymerizable diene such as 2,3 dichloro-1,3-butadiene or an acrylic derivative. The highly viscous polymers so formed are plasticized by treating the latex with a peptization system. Such systems are usually based on thiurams (1) and/or dithiocarbamates (2), which are known to form carcinogenic nitrosamines (3) during processing and storing of the rubber, the compounds and the final article.

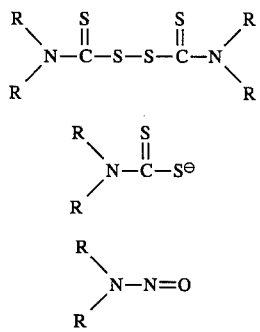

U.S. Pat. No. 3,984,609 to Branlard et al. describes the peptization of chloroprene/sulfur copolymers, made in the presence of a modifying agent such as iodoform or a dialkylxanthogen disulfide, by adding to alkaline latexes of such copolymers a modifying agent which is a thiol of the formula R-SH wherein R includes, amongst other groups, an arylthiazole so as to give mercaptobenzothiazole as the modifying agent. The curing systems used with these copolymers use a nitrosamine forming accelerator, i.e., 2-mercaptoimidazoline.

Nitrosamine formation with the above systems can be avoided by curing the copolymers with metal oxides alone or omission of 2-mercaptoimidazoline as an accelerator. However, in these cases there is an insufficient cure.

A goal in the rubber industry is to provide the outstanding processability of conventional chloroprene/sulfur copolymers, which use thiurams as peptizing agents, while at the same time avoiding the formation of nitrosamines. The processability of such copolymers is characterized by (1) further peptizability during compounding and curing, (2) reasonably long storage stability for safe handling and low scorch, and (3) high rate and final state of cure when cured by metal oxides only. The present invention meets this goal.

SUMMARY OF THE INVENTION

According to the present invention there is provided a process for curing a chloroprene/sulfur copolymer peptized in an alkaline dispersion by a xanthogen disulfide alone or in combination with mercaptobenzothiazole which comprises curing said copolymer in the presence of N-cyclohexyl-2-benzothiazyl-sulfenamide or mercaptobenzothiazole disulfide as an accelerator and in the absence of nitrosamine forming additives.

DETAILED DESCRIPTION OF THE INVENTION

A realistic alternative to the peptization of sulfur/chloroprene copolymers by conventional thiurams and dithiocarbamates is the use of a xanthogen sulfide (XS) added directly to the polymerization emulsion. Xanthogen sulfides (4) have the formula:

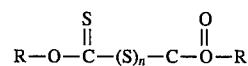

An XS acts as a modifier during polymerization and as a peptizing agent after polymerization during ageing of the latex, by breaking down the sulfur chains of the copolymer.

For low sulfur copolymers the effectiveness of low levels of XS is significantly enhanced by mercaptans, such as mercaptobenzothiazole (5), or their alkali metal salts.

Simple alkylmercaptans are not as effective as 5 (MBT):

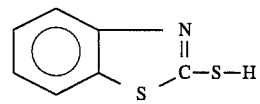

A xanthogen sulfide (4) may also be added after stabilization to a latex modified only by sulfur in combination with (5) to reduce the viscosity of the copolymer. Typically, about 0.15–1.5 parts of XS per hundred parts of monomer (phm) are used, preferably 0.2–1 phm. At the low end of this range (i.e., less than 0.4), the XS is used in combination with MBT at a concentration of 0.05–0.3 phm, preferably 0.1–0.2 phm.

The Mooney viscosity of the isolated polymer and the level of ultimate peptizability are determined by the polymerization conditions, the order in which plasticizer is added, the sulfur/XS/MBT-level and the ageing conditions of the polymer latex.

Copolymers peptized as described above have different processability and cure properties than standard chloroprene/sulfur copolymers. For example, when cured with conventional metal oxide curing agents, the nitrosamine precursor-free peptized copolymer is extremely scorchy, but slow curing. In addition, the final copolymer does not achieve an equivalent state of cure.

A significant improvement of the cure properties is achieved by compounding the copolymer with small quantities of mercaptobenzothiazole disulfide (6) or similar curatives not forming carcinogenic nitrosamines such as N-cyclohexyl-2-benzothiazyl-sulfenamide (7) which have the formulas:

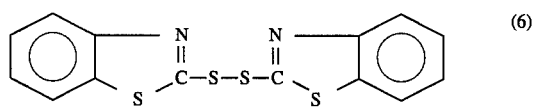

MBTS

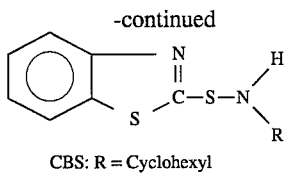

CBS: R = Cyclohexyl

MBTS helps to lower the compound viscosity, it ensures extended scorch safety and finally it accelerates the cure so that the system cures at a rate comparable to that of standard chloroprene/sulfur copolymers. Although the MBTS might also be incorporated into the polymer latices during manufacture, this does not result in any improvement in properties versus addition during compounding. Further, if the copolymer already contained MBTS, a compounder would lose the ability to adjust cure properties according to his needs.

The metal oxide curative used in the process of the invention may be a single alkaline earth metal oxide, or zinc oxide, or a combination of oxides, for example zinc oxide and magnesium oxide. In either case the combination with MBTS provides superior scorch safety which allows for fine tuning of processability. For applications in which a higher state of cure is required, it has been found advantageous to add aryl guanidines, (8) which permit nitrosamine-free acceleration. Examples of suitable aryl guanidines include phenyl and tolyl guanidines. It is preferable when using an aryl guanidine also to add a sulfur donor, such as dicaprolactam disulfide (9).

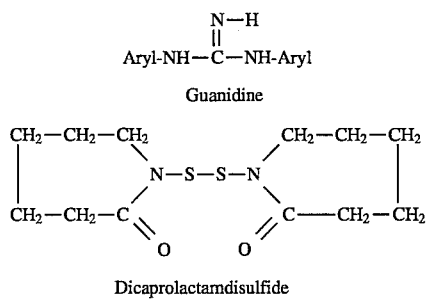

MBTS is used at a level of 0.3–2 parts by weight per hundred parts by weight of rubber (phr), preferably about 1 phr is sufficient to provide a good scorch time and a reasonable cure time comparable to standard thiurams peptized copolymers. When an aryl-guanidine such as di-ortho toluene guanidine (DOTG) is used, a level of 0.3 to 1.5 phr can be used to increase the state of cure by simultaneously reducing the scorch time, still providing a nitrosamine-free cure. When a sulfur donor is used, 1–2 phr have been found to be adequate; but lower or higher levels can be used.

The resulting copolymers can be cured in the usual rubber processing apparatus such as mills and Banbury mixers. Other materials can be added during curing as is well known in the rubber industry. These include anti-oxidants, softeners and extenders, processing aids, accelerators and retarders. The important consideration is that none of these other additives should be capable of forming nitrosamines.

The invention can be further understood by the following examples in which parts and percentages are by weight and temperature is in degrees Celsius.

Polychloroprene latices were prepared by copolymerization of an alkaline chloroprene (CD) emulsion with 0–20 phm of an ethylenically unsaturated monomer such as 2,3-dichlorobutadiene-1,3 (ACR) in the presence of 4 phm rosin as an emulsifier and 0.3–0.6 phm of sulfur up to 75% conversion modified by 0–0.5 phm of diisopropylxanthogen disulfide (4: R=i-Propyl,n= 2) abbreviated as PXD.

After short stopping and stabilizing the dispersion, the copolymer was peptized by ageing over a period of 3–20 hrs in the presence of 0–0.25 phm of mercaptobenzothiazole (MBT) and an additional 0–0.5 phm of PXD.

The isolated polymers exhibit a viscosity of 25–70 Mooney units, adjustable by the ageing time and the level of MBT and PXD used for peptization. They vary in peptizability according to method of preparation.

EXAMPLE 1

A chloroprene/2,3,-dichlorobutadiene-1,3/sulfur copolymer was prepared in a nitrogen-blanketed 10-gal (37.85 liters) reactor by mixing 19.6 kg chloroprene, 0.4 kg 2,3-dichlorobutadiene-1,3, 0.5 parts per hundred of polymerizable monomer (phm) of diisopropyl xanthogen disulfide (PXD) as a 50% toluene solution, 4 phm wood rosin, 94.13 phm water, 0.63 phm sodium hydroxide, 0.4 ppm copper ions, and 0.45 parts of elemental sulfur added as a slurry in 20% aqueous solution of a sodium salt of formaldehyde condensation product of naphthalene sulfonic acid (LOMAR® PW), while incrementally adding an aqueous solution containing 5% of potassium persulfate and 0.125% 2-anthraquinone sodium sulfonate. The polymerization temperature was maintained at 40°. After reaching a conversion of 69% (indicated by an increase in the specific gravity of the latex to 1.064 g/ml), the polymerization was stopped by adding 0.7 phm of a stabilizer emulsion prepared from 27.83 parts of water, 61.57 parts of toluene, 2.08 parts of 85% 4-tert.-butyl-catechol (PTBC), 5.08 parts of 30% sodium lauryl sulfate (DUPONOL® WAQE), 1.76 parts of LOMAR® PW and 1.76 parts of phenothiazine (PTZ).

Following the addition of the stabilizer emulsion and ageing the latex over a period of 7 hours, the unpolymerized monomers were removed by steam stripping.

The latex was aged for a total of 18 hours, the pH was adjusted to 5.5 and a polymer of 35 Mooney viscosity was isolated by coagulation on a freeze roll.

The chloroprene copolymer was compounded on a rubber mill with the ingredients shown in Table I and cured for 30 minutes at 160°.

Physical properties of the cured composition are shown in Table I. In addition, physical properties of a sample which was compounded and cured in the same manner, but which contained no mercaptobenzothiazole disulfide (MBTS) are also shown for comparison. It can be seen from the data that the presence of MBTS during cure results in an extension of scorch time (ts2: time for 2 dNm increase of torque) from 3.8 minutes to 4.3 minutes and an increase in the rate of cure reducing the time for 90% cure (t90) from 28.2 to 18.6 minutes.

Compositions of the control would be too scorchy and slow curing for practical use.

EXAMPLE 2

A chloroprene/2,3,-dichlorobutadiene-1,3/sulfur copolymer was prepared as in Example 1 using the same ratio of monomers and other ingredients, but polymerizing it in the presence of 0.25 phm of PXD. After stabilization, the latex was treated by 0.15 phm of mercaptobenzothiazole (MBT) added as a sodium salt in 25% caustic solution. A polymer having a Mooney viscosity of 34.4 was isolated. A sample was compounded, cured and tested as shown in Table. I.

EXAMPLE 3

Example 1 was repeated in a 5-liter flask based on 2 kg of polymerizable monomers using the same ratio of monomers and other ingredients, except that no PXD was present during polymerization. After the polymer had been stabilized, the latex was treated with 0.15 phm of MBT, added as a sodium salt in 25% caustic solution, and a 0.4 phm PXD as a 33% aqueous emulsion. A polymer having a Mooney viscosity of 41.9 was isolated for compounding, curing and testing as shown in Table I.

EXAMPLE 4

A chloroprene/2,3-dichlorobutadiene-1,3/sulfur copolymer was prepared, as in Example 2, using the same ratio of monomers and other ingredients but on a larger scale. The reaction was short stopped by addition of a solvent-free dispersion of 0.012 phm of PTZ and 0.012 PTBC. After stabilization, the latex was treated with 0.1 phm of MBT added as a sodium salt in 25% caustic solution. A polymer having a Mooney viscosity of 36.5 was isolated.

The polymer obtained was compounded, cured and tested as shown in Table II to evaluate the impact of various accelerators not forming carcinogenic N-nitrosamines on processing properties and cure site density.

Physical testing was conducted in accordance with the following test procedures:

ASTM D 412—Tensile strength and elongation at break.
ASTM D2084—ODR.
ASTM D2240—Shore A hardness.
ASTM D 624—Tear strength, Die C.
ASTM D 395—Compression set.
ASTM D 813—De Mattia, nicked.

It can be seen from Table I that the addition of MBTS to compounds extends the scorch time and increases the rate of cure.

TABLE II

Nitrosamine-Free Cure for High-Modulus Chloroprene/Sulfur Copolymers

| | Example 4 | | | | |
|---|---|---|---|---|---|
| Polymerized | S (0.45 phm)/PXD (0.25 phm) | | | | |
| Peptized | MBT (0.1 phm) | | | | |
| Compounded: | | | | | |
| Pol.(100 phr), MgO(4 phr), Stearic acid.(1 phr), Octamine(2 phr), N-762(58 phr), Arom. Oil(10 phr), ZnO(5 phr): | | | | | |
| MBTS [phr] | 1 | | 1 | | 0.5 |
| DOTG [phr] | | 1 | 1 | 1 | 1 |
| DCD [phr] | | | | 1 | 2 |
| ODR (30 min) [170 C.] | | | | | |
| M1 [dN.m] | 8.46 | 13.74 | 5.83 | 17.77 | 6.62 |
| Mh [dN.m] | 84.99 | 114.8 | 86.34 | 111.82 | 113.97 |
| ts2 [min] | 2.05 | 0.056 | 1.07 | 0.96 | 1.71 |
| tc90 [min] | 15.63 | 16.11 | 15.36 | 17.5 | 15.59 |
| CURE: 170 C. [min] | 18 | 18 | 18 | 20 | 16 |
| Hardn. [Sh.A] | 67 | 68 | 69 | 71 | 70 |
| M100 [MPa] | 2.9 | 3.6 | 3.2 | 4.4 | 3.9 |
| M300 [MPa] | 15.3 | 18.7 | 15.5 | 21.3 | 18.9 |
| Tensil Str. [MPa] | 21.8 | 22.5 | 21.5 | 21.4 | 21.3 |
| Elong. [%] | 448 | 367 | 429 | 302 | 349 |
| Tear. (die C) [kN/m] | 48.4 | 42.4 | 46.6 | 39.7 | 41.4 |
| CS (22h/100 C.) [%] | 32.7 | 19.5 | 30.6 | 22.6 | 35 |

TABLE I

Nitrosamine-Free Cured Chloroprene/Sulfur Copolymers

| | Example 1 | | Example 2 | | Example 3 | | |
|---|---|---|---|---|---|---|---|
| Polymerized | S(.45)/PXD (.5) | | S(.45)/PXD (.25) | | S(.45) | | |
| Peptized Compounded: | | | //MBT(.15) | | //PXD(.4)/MBT(.15) | | |
| Polymer (100 phr), MgO (4 phr), Stearic acid (1 phr), Oct. Diph-Amin (2 phr), N-762 Black (58 phr), Arom. Oil (10 phr), ZnO (5 phr): Cured 30 min/160 C. | | | | | | | |
| MBTS [phr] | 0 | 1 | 0 | 1 | 0.5 | 1 | 1.5 |
| Cure Properties ODR 30' @ 160 C. | | | | | | | |
| M-1 [dNm] | 11.9 | 5.4 | 12.1 | 7 | 13.9 | 12.5 | 11.6 |
| M-h [dNm] | 75.1 | 80.8 | 75 | 92.1 | 101.7 | 101.7 | 100.1 |
| ts2 [min] | 3.8 | 4.3 | 2.5 | 4.3 | 3.4 | 3.8 | 4.1 |
| tc90 [min] | 28.2 | 18.6 | 27.2 | 15.9 | 17.1 | 13.5 | 12.1 |
| Cured @ 160 C. [min] | 30 | 30 | 30 | 30 | 30 | 30 | 30 |
| Original | | | | | | | |
| M-100 [MPa] | 3.9 | 3.8 | 3.7 | 3.7 | 3.7 | 3.4 | 3.3 |
| M-200 [MPa] | 10 | 8.7 | 9.7 | 8.8 | 9.5 | 8.1 | 7.9 |
| Tens. St. [MPa] | 17.4 | 15.9 | 18.1 | 17 | 17.8 | 17.6 | 17.3 |
| Elong. [%] | 363 | 372 | 393 | 415 | 414 | 444 | 469 |
| Hard. [ShA] | 70 | 70 | 69 | 70 | 68 | 70 | 67 |
| Tear St. [kN/m] | 46.725 | 51.45 | 46.9 | 50.225 | 49.175 | 53.55 | 53.55 |
| DeMat. (nicked) | 165 | 336.6 | 140 | 336.6 | | | |
| CS: 22h/100 C. [%] | 38.5 | 43.1 | 35.5 | 40.5 | 32 | 36 | 40 |
| Aged (14d/100 C.) | | | | | | | |
| M-100 [MPa] | 8.2 | 7.7 | 7.2 | 7.3 | 7.8 | 7.4 | 6.8 |
| Tens. St. [MPa] | 17.3 | 15.3 | 17.4 | 16.8 | 18.6 | 17.6 | 17.8 |
| Elong. [%] | 229 | 215 | 267 | 266 | 265 | 275 | 304 |
| Hard. [ShA] | 79 | 82 | 79 | 81 | 78 | 80 | 78 |

It can be seen from Table II that the use of MBTS allows for better processing; and in combination with additives which do not form nitrosamines and which act as additional accelerators, the final state of cure is increased.

What is claimed is:

1. A process for curing a chloroprene/sulfur copolymer, said copolymer having been peptized in an alkaline dispersion by a xanthogen disulfide peptizing agent, which comprises curing said copolymer in the presence of N-cyclohexyl-2-benzothiazyl-sulfenamide or mercaptobenzothiazole disulfide as an accelerator and in the absence of nitrosamine forming additives.

2. A process according to claim 1 wherein the copolymer is cured with a metal oxide.

3. A process according to claim 1 wherein an aryl guanidine alone or in combination with a sulfur donor is added as an additional accelerator.

4. A process according to claim 1 wherein the accelerator is mercaptobenzothiazole disulfide added at a concentration in the range of 0.3–2 parts by weight per hundred parts by weight of copolymer.

5. A process according to claim 3 wherein the aryl guanidine is N,N'-di-ortho-tolylguanidine and said aryl guanidine is added at a concentration in the range of 0.3 to 1.5 parts by weight per hundred parts by weight of copolymer.

6. A process according to claim 1 wherein the xanthogen disulfide is diisopropylxanthogen disulfide.

7. A process according to claim 1 wherein the chloroprene/sulfur copolymer has been peptized in the presence of a xanthogen disulfide and a mercaptan.

8. A process according to claim 7 wherein the mercaptan is mercaptobenzothiazole.

\* \* \* \* \*